(12) United States Patent
Kahan

(10) Patent No.: US 7,278,616 B2
(45) Date of Patent: Oct. 9, 2007

(54) FLEXIBLE, MULTI-GAUGE ATTACHMENT DEVICE

(76) Inventor: Thomas E. Kahan, P.O. Box 21372, Oakland, CA (US) 94611

( * ) Notice: Subject to any disclaimer, the term of this patent is extended or adjusted under 35 U.S.C. 154(b) by 0 days.

(21) Appl. No.: 11/282,020

(22) Filed: Nov. 17, 2005

(65) Prior Publication Data

US 2006/0065803 A1    Mar. 30, 2006

Related U.S. Application Data

(63) Continuation of application No. 10/772,057, filed on Feb. 3, 2004, now abandoned.

(60) Provisional application No. 60/444,438, filed on Feb. 3, 2003.

(51) Int. Cl.
| A47B 96/06 | (2006.01) |
| A47G 29/00 | (2006.01) |
| A47K 1/00 | (2006.01) |
| E04G 3/00 | (2006.01) |
| E04G 5/00 | (2006.01) |

(52) U.S. Cl. ............... 248/214; 248/534; 248/539
(58) Field of Classification Search ............... 248/314, 248/214, 230.1, 229.16, 534, 540, 539; 446/176, 446/217; 285/197, 198, 199; 138/92, 99
See application file for complete search history.

(56) References Cited

U.S. PATENT DOCUMENTS

| 582,167 | A | * | 5/1897 | Bernheimer | 362/476 |
| 2,797,621 | A | * | 7/1957 | Gladen | 359/525 |
| 2,995,855 | A | * | 8/1961 | Bell | 43/21.2 |
| 3,252,241 | A | * | 5/1966 | Gould | 446/217 |
| 4,108,535 | A | | 8/1978 | Slaughter | |
| 4,488,372 | A | * | 12/1984 | Lowen | 446/27 |
| 4,903,177 | A | * | 2/1990 | Warning | 362/123 |
| 4,908,000 | A | * | 3/1990 | Counts | 446/216 |
| 4,966,397 | A | * | 10/1990 | McKinnon | 285/197 |
| 5,027,992 | A | * | 7/1991 | Murray, III | 224/181 |
| 5,039,056 | A | * | 8/1991 | Paxton | 248/539 |
| 5,340,069 | A | * | 8/1994 | Niemeyer | 248/214 |
| 5,361,718 | A | | 11/1994 | Cheng | |
| 5,906,341 | A | * | 5/1999 | Brown | 248/49 |
| 6,206,258 | B1 | | 3/2001 | Calder | |
| 6,378,819 | B1 | * | 4/2002 | Johnson | 248/214 |

* cited by examiner

*Primary Examiner*—Amy J. Sterling
(74) *Attorney, Agent, or Firm*—Brian Beverly; Beeson Skinner Beverly, LLP

(57) ABSTRACT

A flexible, multi-gauge attachment device for mounting pinwheels, flags and other objects supported by posts onto various parts of the frames of bicycles, bicycle trailers, scooters, strollers, wheelchairs and other vehicles and products with tubular components.

9 Claims, 2 Drawing Sheets

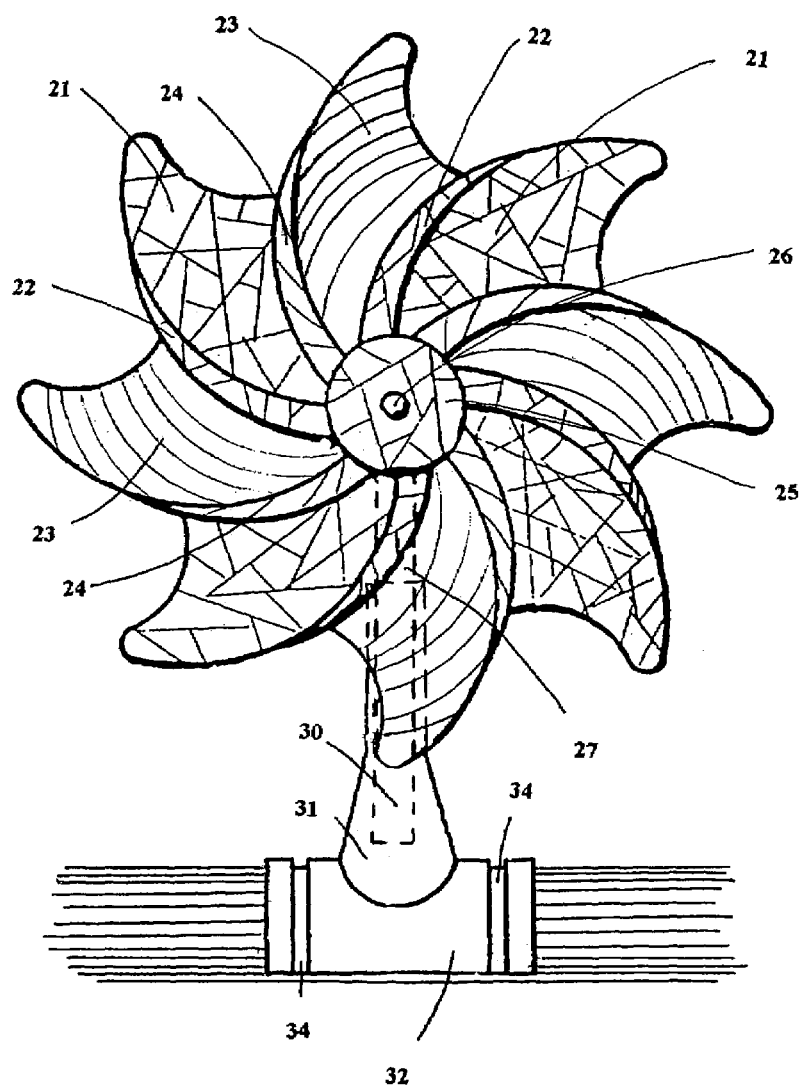 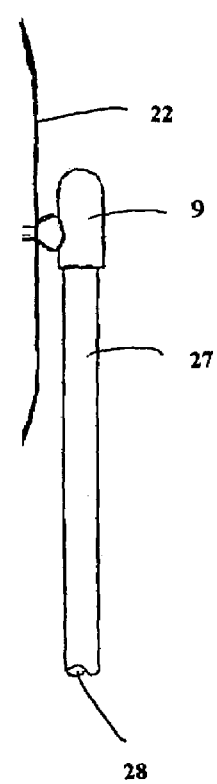
Fig. 1.
Fig. 2.

FLEXIBLE, MULTI-GAUGE ATTACHMENT DEVICE

CROSS-NOTING INFORMATION

This application is a continuation of prior application Ser. No. 10,772,057, filed Feb. 3, 2004, now abandoned which claimed the benefit of U.S. Provisional Application No. 60/444,438, file Feb. 3, 2003.

BACKGROUND OF THE INVENTION

1. Field of the Invention

This invention relates to attachment devices, and more specifically to a flexible, rubber-like multi-gauge attachment device that uses tying or other strapping means for mounting objects supported by posts, like pinwheels onto any tubular part of the frames of bicycles, bicycle trailers, scooters, wheelchairs, strollers and other vehicles and products with tubular components.

2. Prior Art

Previously, it has been difficult for children to effectively mount pinwheels or flags for fun on their bikes, tricycles and scooters and likewise for their parents for more safety-related reasons. The prevailing method for years has been either adhesive tape or rubber bands but neither of these methods look or more importantly work particularly well, due to the constant wind pressure they are under.

Attachment devices designed to hold flags next to bicycles and bicycle trailers also have their problems and limitations which is probably why children haven't adopted them for mini-flags or pinwheels. They are designed to support tall flag shafts in a vertical position close to the trailer's frame or body. As a result, it's difficult for children to stick pinwheels in these devices because most pinwheels have sticks shorter than 16 inches and petals wider than 5 inches. Both of these together mean the pinwheel's vanes will tend to hit either the spokes or the body of the trailer and not spin smoothly and efficiently. Moreover, they are also not designed to hold the flag shafts sideways, i.e. horizontally and perpendicularly away from the trailer body or tubing.

Attachment devices for holding flashlights onto bicycle handlebars have their problems and limitations. Firstly, they are not designed to hold pinwheel sticks which are much narrower than flashlights nor attach to larger or narrower than handlebar tubing, such as the frame that typically attaches to the rear wheel's axle. Additionally, even if they could be jury-rigged to accommodate a narrower pinwheel post, they are not designed to hold it sideways, i.e. facing horizontally and perpendicularly away from the frame, another limitation as there is only so much tubing on bicycles and tricycles that can accommodate a vertical oriented pinwheel or flag.

Previously, there have been some inventions to pair up the pinwheel concept to bicycles. U.S. Pat. No. 4,108,535 issued Dec. 3, 1976 to Harold Slaughter, discloses a device for attaching a pinwheel type safety device to bicycles. It appears to attach though only to bicycle fenders, and by means of a short screw and nut. This requires drilling a hole through the fender and securing it with a nut underneath. It takes great care and is time consuming to drill a hole and secure a nut to a curved fender closely positioned above an easily punctured tire. The alternative would also seem to be tricky and time consuming; i.e., dismantling the fender, drilling a hole on a curved piece of metal, securing the device on with the nut, and putting it all back together again. If we grant this device a longer screw that would allow it to also attach to a bicycle's or scooter's frame and/or handlebar, then drilling through tubing, typically thicker and more curved than fenders, becomes even more troublesome. Another disadvantage is that it in addition to a standard pinwheel, it has an extra part, a shroud meant to "protect" people from injury due to the pinwheel's petals and meant to protect the pinwheel from the "blowing garment" of the rider. This extra part makes it more expensive to manufacture and thus to purchase. Finally, it is not designed to allow children to be able to put their own pinwheels heads or flags shafts into it.

U.S. Pat. No. 5,361,718, issued Nov. 7, 1994 to Tien-Chu Cheng, also involves an extra part, a rim around its pinwheel, making it more expensive to manufacture and thus to purchase. It too requires drilling through tubing but because of its inflexible ring, drilling through tubing of only one size.

Another kind of attachment device, this one for holding sunglasses onto bicycles has its problems. U.S. Pat. No. 6,206,258, issued Mar. 27, 2001 to Michael Calder discloses such a device where the aperture through which one of the sunglass wands passes through is not only too wide to securely hold a narrow pinwheel stick upright under constant wind pressure but additionally the clip inside this aperture has a small contact surface, is soft rubber and similarly not designed to secure anything under much pressure. This is because the sunglasses are folded in an upside down V over the edge of the aperture and gravity for the most part does the rest, with the clip minimizing side to side movement. There is also a disadvantage to this sunglass carrier's attachment device, its built-in cable tie molded as a part of the carrier device. If like most cable ties, once pulled and tightened it can't be untightened without being cut, then this type of attachment device has a one-use only application and can't be reattached elsewhere. If its built-tab, as shown but not clarified in the patent, releases the cable tie without its being cut, then it lends itself to easily being stolen.

OBJECTS AND ADVANTAGES

Devices designed to support flags on bicycles and bicycle trailers but which may conceivably also support a pinwheel with a long stick are designed to only hold the flag's shaft vertically and in a close position relative to the bicycle/bicycle trailer or its wheels.

Accordingly, one object is to provide a device that allows a pinwheel to not only be attached in a vertical position but also in a horizontal position sideways away from the vehicle or its wheel. This allows a cyclist for example who rides at night to horizontally attach two standard large-size reflective pinwheels of approximately 7 inch diameter sideways away from their rear wheel support strut and not worry about the pinwheel's vanes hitting and being damaged by the rear wheel spokes.

Devices designed to hold flashlights onto handlebars are not designed to accomodate much narrower pinwheel sticks. Nor are they designed to hold objects perpendicularly either vertically or horizontally sideways from the handlebar with their rear flush with same. Nor are they designed to hold flashlights on widely different sized tubing.

Accordingly, one object is to provide a device that can hold a narrow pinwheel stick. Another object is that it can hold it perpendicularly either vertically or horizontally sideways away from the tubing. Another object is that it can do so with most any sized tubing. This attachment device for pinwheels on sticks accomplishes all three.

Slaughter's device is quite difficult and time consuming to attach and reattach to bicycles and other vehicles. Slaughter's device also has a shroud around its pinwheel creating another part in addition to a pinwheel and making it difficult if not impossible for a child to put their own pinwheel in it.

Accordingly, one object is to provide a device holding a pinwheel which is quick and easy to attach and reattach to most anywhere on the frame of a bicycle, tricycle, scooter or other similar vehicle or structure with tubular frame. This attachment device accomplishes that by being made of a flexible material such as rubber in a C-shape so it can easily go around various diameters of tubing and then be secured with two easy-to-use cable ties. To reattach them elsewhere, they're easily cut with scissors or wire snips and then reattached with two inexpensive, widely available cable ties. Another object was to make a attachment device that is simple, inexpensive and which allows a child to easily retrofit it with their own pinwheel, flag or other object with stick.

Cheng's device, because it requires drilling a hole, is also difficult and time consuming to attach and reattach to vehicles. It too cannot go on various sized tubing and also involves an extra part, an outer rim, making it more expensive.

Accordingly, one object is to provide a device holding a pinwheel which is quick and easy to attach and reattach to most anywhere on the frame of a bicycle, tricycle, scooter or other similar vehicle or structure with tubular frame. This attachment device accomplishes that by being made of a flexible material such as rubber in a C-shape so it can easily go around various diameters of tubing and then be secured with two easy-to-use cable ties. Another object is to make a pinwheel with as few parts as possible as so as inexpensive as possible. This invention also accomplishes that.

Calder's sunglass carrier can only hold large objects such as sunglasses that fold with appendages that go vertically through a large aperture and do not undergo much air pressure. Its built-in cable tie attachment system is either not reusable or lends itself to easily being stolen.

Accordingly, one object is to provide an attachment device that can hold smaller non folding objects such as pinwheels. Another object is to provide a device that can hold such objects both vertically and horizontally under much wind pressure. Another object is that the attachment system be easily reusable and at the same time not lend itself to easily being stolen. This attachment device for pinwheels on sticks accomplishes all three.

Further objects and advantages will become apparent from a consideration of the ensuing description and the accompanying drawings.

SUMMARY OF THE INVENTION

This multi-gauge attachment device is a flexible, rubber-like attachment device that has a hollow barrel for accommodating the base of pinwheel posts, flags shafts or other posts which support objects. It has a flexible C-shaped base which can wrap around and mount onto various different gauges of tubular components on vehicles and other products with tubular components. This flexible base is secured with ties or other strapping means which hold it firmly to said tubular component.

BRIEF DESCRIPTION OF THE DRAWINGS

FIG. 1 is a front view of the preferred embodiment on a bicycle handle bar.

FIG. 2 is a side view of the preferred embodiment's pinwheel rear stem head and support stick.

DETAILED DESCRIPTION OF THE PREFERRED EMBODIMENT

Figure 3:
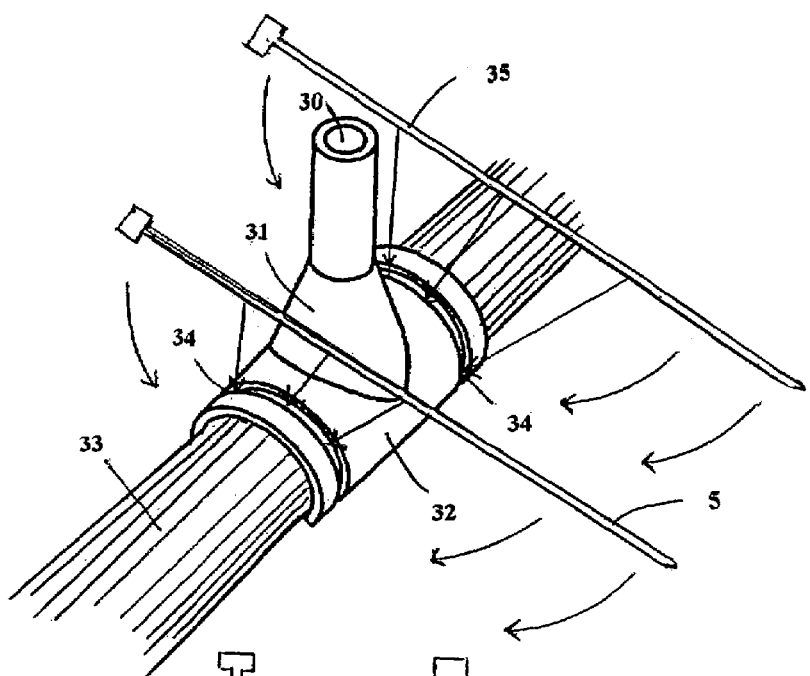
FIG. 3 is a perspective, semi-exploded view of a flexible sleeve-clamp and cable ties on a bicycle handle bar.
Figure 4:
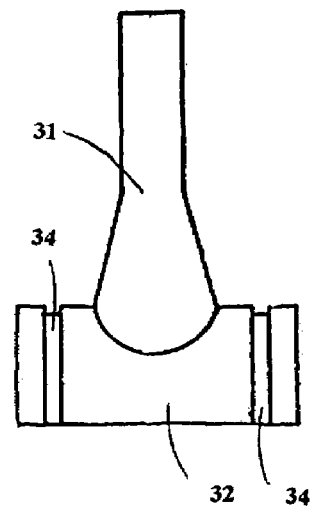
FIG. 4 is a side view of the flexible sleeve-clamp.

FIG. 1 shows a preferred embodiment of both the attachment device and the preferred embodiment of the pinwheel as positioned on a bicycle handle bar, facing forward, with the pinwheel having four double-sided holographic vanes 21, with each vane's back side 22 twisted forward 180 degrees and held into place by a tip 26. The 180 degree twist allows the pinwheel to reflect light from the side and the "shattered-glass" type of opalescent holographic material is used to further and most effectively reflect light from different angles. Because holographic material is expensive and four holographic vanes rapidly spinning reflect almost as much light as eight, four other vanes 23 having multi rainbow-colored swirls on them add a different but also visually pleasing blurring effect. These non-holographic vanes could also be single colored, polka dotted or have various theme park or sports team logos, colors etc. The pinwheel can be made from any combination of reflective materials, preferably light weight holographic and reflective foil for safety, economy and effectiveness, Vanes 23 also have back sides 24 twisted forward 180 degrees and held in place by tip 26. A centerpiece 25 is made of the same holographic foil as vanes 21, and is also secured in place by tip 26. The construction of the pinwheel is conventional and may take any operative form.

As shown in FIG. 2, the pinwheel has a support stick 27 that has a hollow interior 28 and is inserted but not glued at one end into a conventional rear stem head 29 of the pinwheel. The fact that the rear stem head 29 is not glued onto the support stick 27 allows the entire pinwheel with all its vanes 21 and 23, all attached to rear stem head 29, to be easily rotated in any direction to catch the wind. This means it can not only be attached to a handlebar facing the wind where the wind is perpendicular to the handle bar, as shown in FIG. 1, but it can also be rotated 45 degrees to face the wind if it is attached to a part of a bicycle's frame, which like the strut that holds the rear wheel axle, angles 45 degrees down from horizontal, i.e. the wind's direction.

Figure 5:
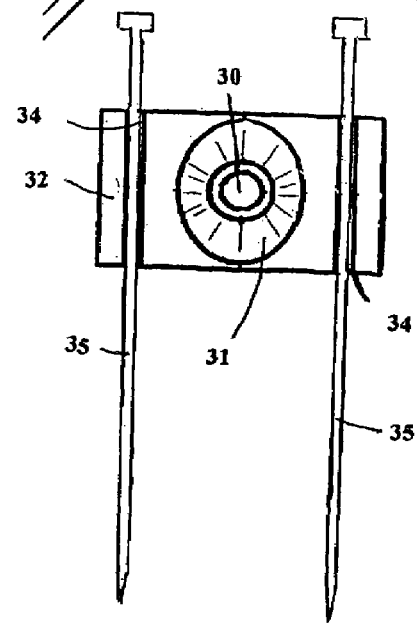
FIG. 5 is a top down view of the flexible sleeve-clamp with cable ties.
Figure 6:
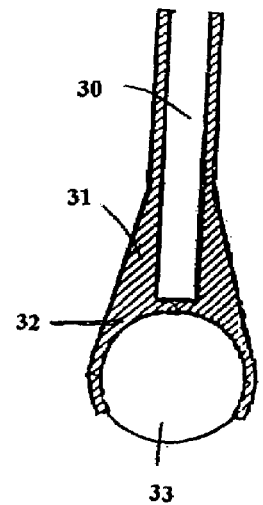
FIG. 6 is a cross-section view of the flexible sleeve-clamp on tubing.

FIG. 1 shows support stick 27 inserted at its other end into hollow shaft 30. Shaft 30 is inside a cone-based support barrel 31 which is molded out of the same piece of rubber as a flexible sleeve-clamp 32. Sleeve-clamp 32 has a semi-cylindrical shape. Made of rubber, and relative to its molded shape as shown in FIG. 6, sleeve-clamp 32 can be either widened to accommodate larger tubing or tightened for narrower tubing. FIG. 3 also shows this ability of sleeve-clamp 32 to wrap around tubing 33. A support barrel 31 has a cone shape base and is part of the same molded piece as sleeve-clamp 32. EPDM rubber is preferably used to make the sleeve-clamp because it makes sleeve-clamp 32 flexible enough to accommodate a wide range of diameters of tubing and more durable. EPDM rubber also has ultra-violet resistance so that it can be used outside without becoming brittle. FIGS. 1, 3, and 5 show from various angles two slots 34 which are also part of the same molded piece as sleeve-clamp 32.

FIGS. 3 and 5 show two cable ties 35 before and after they are pressed inside into slots 34. These cable ties 15 are then fastened together and tightened around whatever mount the user can and wants to attach the safety reflector to. Thus the entire safety reflector is securely in place.

OPERATION

The mounting of this attachment device for pinwheels on sticks is as follows. After the user decides where they want to mount it, they open the long slot-like aperture on the bottom of the sleeve-clamp and fit the sleeve-clamp down onto the tubular mounting surface. In its preferred embodiment, a first cable tie is pressed into one of the two slots and its two ends then passed around the tubular surface. These two slots, equidistant from the support barrel, function both to help the user position and hold the cable ties in place while securing them and to spread out and maximize the securing strength of same. One of the two cable tie ends is then pushed through the other end's locking feature and tightened so that one side of the sleeve-clamp is securely fastened to the mounting surface. The same procedure is done with the second cable tie so the sleeve-clamp will be secured in place with two cable ties each positioned in their slot on either side of the hollow shaft. Afterwards, if need be, any extra protruding length of cable ties can be snipped off. The pinwheel's vanes are then rotated to face the wind.

In its preferred embodiment, the hollow EPDM rubber barrel has a swelling cone-shaped base, is molded out of the same piece and material as the sleeve-clamp, and is sized to tightly hold standard pinwheel sticks. The latter three characteristics all add to the attachment device's overall integrity, low cost and ability to hold the pinwheel upright in the wind. Because of this tight fit, its support stick cannot be easily removed. If someone wants to put on their own standard sized pinwheel head, they can take off from support stick the unglued rear stem head with its attached vanes and stick their own pinwheel's head onto the head of the support stick. With alternative embodiments that do not include a pinwheel on stick, any user can simply insert their own object supported by a stick into the hollow shaft in the support barrel.

With the movement of air such as with the wind caused by the user's vehicle moving or someone blowing on any object on a stick stuck inside this attachment device, the object, whether it be a pinwheel, flag, pennant, air-powered whistle will act accordingly, either spinning, waving or whistling.

CONCLUSION, RAMIFICATIONS, AND SCOPE

In conclusion, the reader will see that, according to the invention, I have provided a novel, simple to install, inexpensive, effective, durable and versatile device for attaching pinwheels and other objects supported by posts almost anywhere on the frames of bicycles, tricycles, scooters, strollers, wheelchairs and other objects with tubular components. In conjunction with a reflective pinwheel, its preferred embodiment, it can be used as a stand-alone safety device as the spinning holographic vanes make a very eye-catching, flashing, multi-colored display both during the daytime sunlight and at night when car headlights shine on them from front and rear. They can also be supplemental to other safety devices such as electric flashers, thus adding to the overall safety of the vehicle's operator.

In addition to being purchased primarily to hold a reflective pinwheel as a safety device, some children and teenagers will buy them as toys or interesting bike and scooter decor and by doing so will inadvertently be making themselves safer as well. The same holds true for some rollerbladers and skateboard enthusiasts who will want them as interesting, new and different decor on their helmets. Moreover, not only will rollerbladers and skateboard enthusiasts be more visible to motorists thus making themselves safer, but they will be more visible to pedestrians in crosswalks and on sidewalks who may become a little safer as they may see them sooner than before and have more time to avoid them. Some parents will buy them to entertain their toddlers while they're in their regular or jogger strollers, and by doing so will gain some added visibility and safety for their child and themselves. Some children and cyclists might take off the unglued pinwheel head and stick into the hollow interior of the stick various flags, pennants, streamers, lollipops, whistle and other toys attached to sticks. Some attachment devices may be available with flags and sticks already inside them. Some may be available without any stick-supported product at all.

While the above description contains many specificities, these should not be construed as limitations on the scope of the invention, but as exemplifications of the presently preferred embodiments thereof. Many other ramifications and variations are possible within the teachings of the invention. For example, in regards to its structure, support barrels without a cone-shaped base and/or made separately from the sleeve-clamp are within the scope of the invention. Alternatives to slots such as holes through the sleeve-clamp which can also accommodate cable ties are also within the scope of the invention. Nor is it required that there be any structure at all on top of the sleeve-clamp to help position the cable ties, as this top could be smooth. Similarly, strapping or tieing means other than cable ties are also within the scope of the invention.

In regards to its applications and usage, this attachment device can be used to hold flags, pennants, air-powered whistles, lollipops or any other toy-like product that is supported by a stick. For example, to entertain infants it can attach to cribs, chairs, lamps and other similar tubular mounting surfaces. Thus the scope of the invention should be determined by the appended claim and its legal equivalents, and not by the examples given.

What is claimed is:

1. A device for securely attaching an elongated post of a first predetermined diameter to an elongated mounting support of one of a range of other different predetermined diameters, comprising:

a mount made from a flexible material and having a pair of opposite ends with a hollow, post-receiving barrel at one end and a base at the other end, said hollow, post-receiving barrel made from a flexible material and sized to receive and hold said post, said base made from a flexible material and comprising an elongated sleeve-clamp having a pair of opposite end portions and a C-shaped configuration when seen from either end, said end portions each including a hole, circumferential groove, or other tie-positioning recess for securely holding in place a respective one of said ties or other strapping means, said C-shaped configuration being sized to wrap and extend around at least a major portion of any elongated mounting support having a diameter within a predetermined range of diameters, said hollow, post-receiving barrel being connected to said base and being oriented upright from and extending out from said base, said hollow, post-receiving barrel being joined to a mid-portion of said base so that said two end portions of said base extend out on either side from said hollow barrel, said end portions of said base being secured to said elongated mounting support by a pair of ties or other strapping means, with one of these ties or other strapping means wrapped around each said end portion of said elongated mounting support when said base is affixed to said elongated mounting support so that said mount will be able to hold said post in an upright orientation extending out from said mounting support, a post received in said barrel and a pinwheel mounted on said post.

2. The device of claim 1 wherein said pair of ties or other strapping means are a pair of plastic ties, said plastic ties each comprising an elongated band and an attachment portion at one end.

3. The device of claim 1 wherein said pair of ties or other strapping means are selected from the group consisting of cable ties, stretch cords, cinch ties, rubber-type bands, belts with buckles and tongues, straps with military clamp buckles, and hook-and-loop fastened straps.

4. A device for securely attaching an elongated post of a first predetermined diameter to an elongated mounting support of one of a range of other different predetermined diameters, comprising:

a mount made from a flexible material and having a pair of opposite ends with a hollow, post-receiving barrel at one end and a base at the other end, said hollow, post-receiving barrel made from a flexible material and sized to receive and hold said post, said base made from a flexible material and comprising an elongated sleeve-clamp having a pair of opposite end portions and a C-shaped configuration when seen from either end, said C-shaped configuration being sized to wrap and extend around at least a major portion of any elongated mounting support having a diameter within a predetermined range of diameters, said hollow, post-receiving barrel being connected to said base and being oriented upright from and extending out from said base, said hollow, post-receiving barrel being joined to a mid-portion of said base so that said two end portions of said base extend out on either side from said hollow barrel, said end portions of said base being secured to said elongated mounting support by a pair of ties or other strapping means, said end portions having a respective pair of circumferential grooves, holes, or other tie-positioning recesses into or through which said ties or other strapping means are positioned so as to securely hold said base in place with one of these ties or other strapping means wrapped around each said end portion of said elongated mounting support when said base is affixed to said elongated mounting support so that said mount will be able to hold said post in an upright orientation extending out from said mounting support, a post received in said barrel and a flag mounted on said post.

5. A device for securely attaching an elongated cost of a first predetermined diameter to an elongated mounting support of one of a range of other different predetermined diameters, comprising:

a mount having a pair of opposite ends with a hollow, post-receiving barrel at one end and a base at the other end, said barrel being rigid and inflexible, said base made from a flexible material, sized to receive and hold said post, said base made from a flexible material and comprising an elongated sleeve-clamp having a pair of opposite end portions and a C-shaped configuration when seen from either end, said C-shaped configuration being sized to wrap and extend around at least a major portion of any elongated mounting support having a diameter within a predetermined range of diameters, said hollow, post-receiving barrel being connected to said base and being oriented upright from and extending out from said base, said hollow, post-receiving barrel being joined to a mid-portion of said base so that said two end portions of said base extend out on either side from said hollow barrel, said end portions of said base being secured to said elongated mounting support by a pair of ties or other strapping means, with one of these ties or other strapping means wrapped around each said end portion of said elongated mounting support when said base is affixed to said elongated mounting support so that said mount will be able to hold said post in an upright orientation extending out from said mounting support, said end portions have a pair of circumferential grooves, holes or other tie-positioning recesses corresponding to said pair of ties or other strapping means, a post received in said barrel and a flag mounted on said post.

6. In an attachment device of the type comprising a mount having a base that includes an elongated sleeve-clamp having a pair of opposite ends, said sleeve-clamp having a C-shaped configuration when seen from either end, said clamp being sized to wrap around and clamp onto a mounting support of a predetermined diameter and extend around at least a major portion of said support, and holding means for attaching a post to said base, the improvement wherein said base is made from a flexible material so that it can wrap around and clamp onto at least a major portion of a mounting supports having a diameter within a predetermined range of diameters, said holding means comprising a hollow, post-receiving barrel for removably receiving and holding a plurality of different posts that support pinwheels, mini-flags and other devices, said opposite ends of said elongated sleeve-clamp together having a plurality of circumferential grooves, holes, or other tie-positioning recesses therein, and a corresponding plurality of ties or other strapping means, each positioned in one of said grooves, holes, or other tie-positioning recesses and wrapped around each opposite end portion for securing said attachment device and mounting support together, a post received in said barrel and a pinwheel mounted on said post.

7. The device of claim 6 wherein said said corresponding plurality of ties or other strapping means are plastic ties each comprising an elongated band and an attachment portion at one end.

8. The device of claim 6 wherein said ties or other strapping means are selected from the group consisting of cable ties, stretch cords, cinch ties, rubber-type bands, belts with buckles and tongues, straps with military clamp buckles, and hook and loop fastened straps.

9. The device of claim 6 wherein said end portions include a plurality of circumferential grooves, holes or other tie-positioning recesses corresponding to said ties or other strapping means, and said hollow, post-receiving barrel, separate from said flexible sleeve-clamp, being rigid and inflexible.

* * * * *